Jan. 1, 1924. 1,479,451
J. BUCKSTEIN
FLUID ADMINISTERING DEVICE
Filed Feb. 14, 1923 2 Sheets-Sheet 1
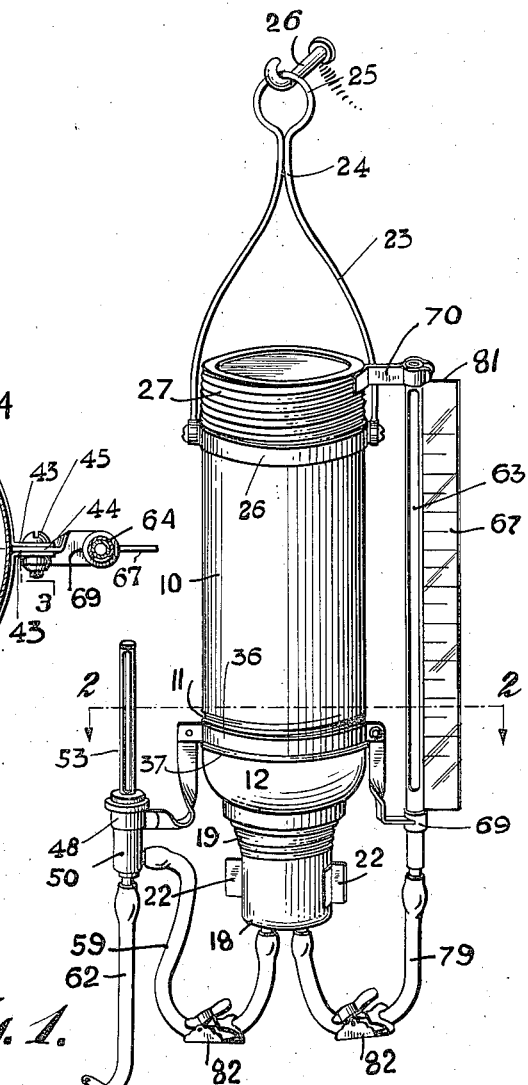
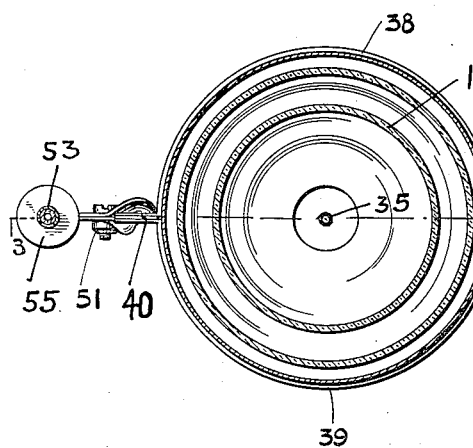
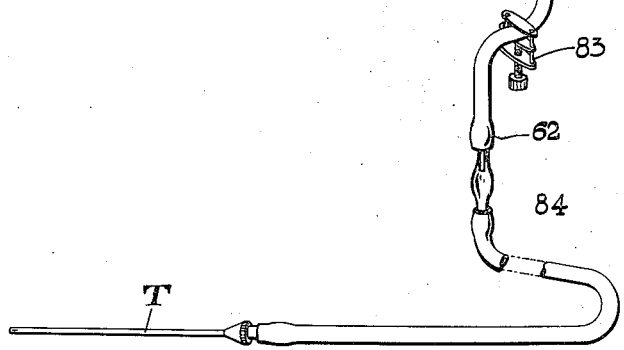
INVENTOR
Jacob Buckstein
BY
Dean, Fairbank, Obriecht & Hirsch
his ATTORNEYS Jan. 1, 1924
J. BUCKSTEIN
FLUID ADMINISTERING DEVICE
Filed Feb. 14, 1923
1,479,451
2 Sheets-Sheet 2
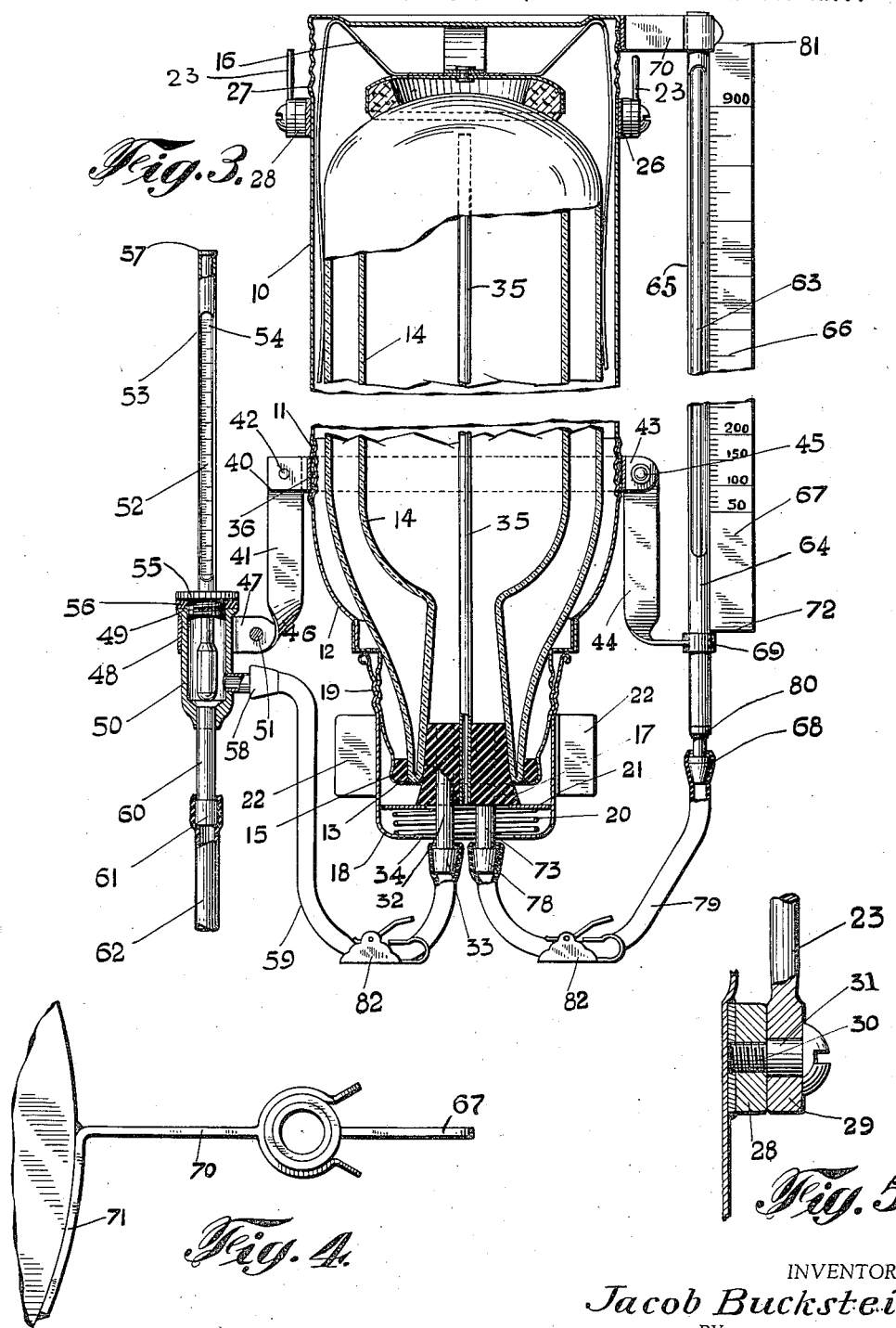
INVENTOR
Jacob Buckstein
BY
Dean, Fairbanks, Obrieght & Hirsch
his ATTORNEYS Patented Jan. 1, 1924.

1,479,451

UNITED STATES PATENT OFFICE.

JACOB BUCKSTEIN, OF NEW YORK, N. Y.

FLUID-ADMINISTERING DEVICE.

Application filed February 14, 1923. Serial No. 618,898.

*To all whom it may concern:*

Be it known that I, JACOB BUCKSTEIN, a citizen of the United States, and resident of New York city, in the county of New York and State of New York, have invented certain new and useful Improvements in Fluid-Administering Devices, of which the following is a specification.

My present invention relates to devices for the administration of fluids to the body, as for intravenous administration, hypodermoclysis, protroclysis, duodenal and intestinal feeding and therapy, transduodenal lavage and the administration of irrigating fluids.

An object of the invention is to provide a simple and relatively inexpensive device for facilitating the delivery of measured quantities of fluid at accurately predetermined temperature to the human body.

Another object is to provide a device of the above type in which the temperature of the fluid can be maintained substantially constant for relatively long periods and without the use of external heating means.

Another object is to provide a device of the above type, which can be easily charged and easily cleaned and sterilized after use, the parts of which shall be unlikely to become broken in use, and any brittle element of which, if broken, can be easily replaced, without the use of tools or the exercise of skill.

In a preferred embodiment of the invention, a substantially conventional vacuum container is employed to maintain the fluid at substantially uniform temperature, said container including the usual vacuum bottle or Dewar flask filler. The container is sustained preferably in inverted position, the delivery therefrom being effected through an outlet tube through the stopper of the filler, and protruding through an appropriate aperture in the screw cap of the container.

According to another feature, measuring accessory means are carried by the container, preferably for indicating clearly both the volume and the temperature of the fluid delivered. For volume measurement, a level gauge is employed, mounted at the side of the container and preferably supported thereon. The gauge preferably comprises a transparent tube, housed in a metallic protective shell, the latter provided with scale markings and communicating with the interior of the bottle through a tube extending through the stopper.

For ascertaining the temperature, a thermometer, preferably also encased for protection, is removably retained in a socket, through which the fluid is delivered in contact with the thermometer bulb on its way to the outlet.

In the preferred embodiment, the gauge and the thermometer socket are supported upon bracket arms projecting from a clamping collar encircling the casing.

The gauge tube is preferably passed through an eye at the end of the corresponding bracket arm and of internal diameter somewhat larger than the tube, the upper end of the gauge being retained in a spring clip, rigidly supported near the corresponding upper end of the inverted container. The protective shell of the gauge has preferably an integral metallic fin bearing the scale markings, the lower edge of said fin resting upon the eye, to accurately position the gauge. In the preferred embodiment, a bail is attached to the end of the vessel, which is uppermost in use, by which the device is supported in vertical position from an appropriate hook. The bail is preferably hinged for ease in shipping and transportation, but is not readily removable thereby to avoid any likelihood of losing or mislaying it.

In the accompanying drawings in which is shown one of various possible embodiments of the several features of the invention, Fig. 1 is a perspective view of my device in suspended position, Fig. 2 is a sectional view on an enlarged scale taken along the line 2—2 of Fig. 1, Fig. 3 is a sectional view on an enlarged scale with parts broken away, taken along the line 3—3 of Fig. 2, Fig. 4 is a fragmentary plan view, and;

Fig. 5 is a detailed sectional view indicating the bail securing means, also on enlarged scale.

Similar reference characters refer to similar parts throughout the several views of the drawings.

Referring now to the drawings, I have shown an apparatus comprising a metallic casing including an inverted cylindrical base 10 having removably secured thereto, as by threaded connection 11, a metallic head 12 with an open mouth 13. Within the container is disposed a common form of vacuum bottle filler 14 of the silvered or nickeled double-wall glass filler or Dewar flask type. A yielding washer 15 near the mouth of the casing head presses the filler inward into firm and yielding coaction with a spring finger holder 16 in the base of the casing 10. The filler is closed by a stopper 17 which may be of rubber or cork. The screw cap closure 18 for the casing mouth 13 is threaded in place thereon as at 19 and exerts yielding spring pressure against the stopper 17 through a coil spring 20 brazed at one end to the interior of the cover and at the other end to an annular washer 21 of internal diameter smaller than the stopper end. By this construction, the stopper regardless of its length, is firmly, yet yieldingly sustained against dropping from its closed position in the inverted filler. In the preferred embodiment, the sheet metal cover has brazed thereto, lugs 22 which afford a purchase for tightening the screw cap.

Referring to Fig. 1, the container is sustained from a bail 23, the arms of which are pressed, and preferably soldered together as at 24, providing a suspension loop 25 at the upper end thereof for hanging on any appropriate hook 26. The bail is preferably hingedly secured to the container by the construction best shown in Figs. 1 and 5. For this purpose, a clamping ring 26 snugly encircles the casing 10, preferably immediately below the head 27 thereon, the end lugs of which (not shown) are securely clamped together as by a screw and nut (not shown) which is preferably also soldered or brazed in position for permanent attachment. Brazed or soldered to the rings at diametrically opposite points are lugs 28 to which the eyes 29, formed integral at the ends of the bail, are secured as by screws 30 threaded into the lugs 28, but unthreaded at the hinge or bearing part 31 for the loop eye. By this construction, it will be seen that the bail will not be detached or displaced, and is yet easily folded backward, to extend between the ends of the container for shipping or for storing the device when out of use.

In the preferred embodiment, the stopper 17 has permanently fixed therein, an outlet tube 32 provided with an enlarged nipple 33, at the lower end thereof protruding through an aperture 34 in the cap 18. In order to permit flow, an air tube 35 is preferably fixed within the stopper extending axially thereof into the filler to near the upper end thereof.

For sustaining the measuring accessories, a second clamping ring 36 is provided, which encircles and snugly engages the container, preferably immediately above and resting in normal use upon the bead 37 adjacent threaded part 11 of the casing. The collar comprises two halves 38 and 39 connected together at lugs 40 between which a metallic bracket 41 is pinned and brazed as at 42, to form a unitary structure. The opposite ends of the half rings have lugs 43 between which is preferably clamped a bracket 44 for sustaining the level gauge, the elements being clamped together as by a screw and nut 45 which may, moreover, be permanently soldered in place to effect a permanent secure connection.

The bracket 41 is of a stamped metal strip, preferably twisted as at 46, so that its end 47 extends outward with the width thereof in a vertical plane. The free end 47 of the bracket is curved into a loop 48, upon the upper edge of which rests the flange 49 of a socket 50 for the thermometer, the loop 48 being securely clamped about the socket, as by a screw and nut connection 51.

The glass tube 52 of the thermometer, which is supported on socket 50, is preferably encased in a metal shell 53 for protection. In the preferred embodiment, the shell comprises a metallic tube cut away as at 54 to provide a window through which the thermometer scale is exposed. The metal tube 53 extends above a metallic closure plug 55 removably threaded into the socket 50. The plug is packed as by a rubberized fabric washer 56 to prevent leak. Preferably in the construction and assembly of the thermometer, the upper or protruding closed end of the thermometer glass tube is softened, and pressed against the contiguous edge of the protective casing to form a head or button 57, thereby providing a particularly secure and ornamental construction. The thermometer socket has an integral lateral inlet nipple 58. A removable short length of rubber tubing 59 connects nipple 33 on the stopper outlet tube with inlet nipple 58 of the socket as shown. An outlet tube 60 is preferably formed as an integral piece and coaxial with the socket 50, to the nipple 61 of which outlet is removably connected the delivery tubing 62. A hypodermic needle or other appropriate fluid administering tip T is removably attached at the other end of tubing 62.

For measuring the volume, I provide an appropriate graduated level indicator. The transparent tube 63 of the level gauge may be a length of ordinary glass tube, which is preferably encased within a metal tube 64, cut-away as at 65 to provide a window for exposing to view, the liquid in the tube 63. Tube 63 rests upon a shoulder 80 in the protective shell and is preferably cemented thereto. The scale markings 66 of the gauge preferably are on a longitudinal fin 67 integral with the protective tube. In the preferred embodiment, the gauge is removably supported upon the container by passing its lower or nipple end 68 through an integral eye 69 formed at the free end of the bracket 44. The upper end of the gauge which extends preferably substantially to the top of the casing is removably secured between the jaws of a spring clip member 70 soldered or brazed as at 71 to the metallic end of the casing. In the preferred embodiment, the inner diameter of the eye 69 is somewhat larger than the diameter of the gauge tube 64, so that after the lower end of the latter is passed through the eye, the upper end may be deflected slightly about the eye as an axis for snapping it into place between the jaws of the clip 70. In the preferred embodiment, the lower edge 72 of the fin 67 rests directly upon the upper edge of the supporting eye 69 thereby accurately positioning or locking the level relative to the container. A rigid tube 73 through the stopper, formed as a rigid part thereof and also protruding beyond cap 18, has a nipple 78 at its lower end connected preferably by a short length of flexible rubber tubing 79 to the nipple 68 at the lower end of the protective tube 64, for the level gauge. The liquid in the gauge, therefore, is at the same level as in the filler, so that the volume of the latter at any instant may be read at a glance, on the correspondingly calibrated scale 66. Preferably the upper edge 81 of the scale fin 67 extends somewhat above the plane of the lower edge of the securing clip 70, whereby for disassembly, the tube may be moved about its axis by grasping the fin and pressing it against the jaw of the clip, thereby causing the upper end of the scale protective shell to emerge gently from between the jaws, avoiding strain upon the lower bracket, which might occur if the gauge were forcibly pulled out from between the relatively tight clip jaws.

Preferably, ordinary stop clamps 82 are provided on conduits 59 and 79, and an adjustable clamp 83 is provided in the length of delivery tube 62 for regulating the rate of flow. A drip bulb 84 may be provided in the length of the delivery tube, so that the number of drops per minute may be observed, thereby facilitating regulation when extremely slow rate of flow is desired.

To charge the device for use, the rubber connections 59 and 79 are severed from the nipples 33 and 78, and the liquid is poured into the filler 14 at the predetermined desired temperature, whereupon the stopper 17 is inserted, and the cap 18 is applied and screwed tight. The tubes 59 and 79 are now reconnected to nipples 33 and 78 respectively, clamps 82 being closed, and the device is suspended by bail 23 from hook 26. Upon opening clamp 82 on tube 79, liquid will rise into level gauge 63, air being expelled through the open upper end of the glass tube. Upon opening clamp 82 on tube 59, liquid in the elevated filler 14 will pass by gravity head through tubing 59 into socket 50, immersing the bulb of the thermometer 52 and thence through the length of tube 62, emerging from the needle or tip 63. After flow has proceeded for a fraction of a minute, the temperature is read from the thermometer 52 and the rate of flow is adjusted by a manipulation of the screw clamp 83. The volume indication on the level being now noted, the tip is applied to the patient, to administer the fluid. From the level 63, it is readily seen at any instant, what volume of liquid has been injected into the body and after the predetermined charge has been administered, the supply is shut off in the obvious manner.

The apparatus is easily taken apart after use for cleaning and sterilizing, the short lengths of rubber 59 and 79 being preferably frequently replaced. The separate constituent disassembled parts comprise the casing 10, the head 12, the cap 18, the filler 14, the stopper 17 therefor, the encased level gauge 64 and the encased thermometer assembly. There are no small parts likely to be lost, the screw cap 18 with its metallic washer 21 and spring 20, being one integral unitary construction, as is the stopper 17 with the tubes 32, 35 and 73.

The preferred vessel described, it will be noted, may be an ordinary relatively inexpensive vacuum bottle of the type in common household use, which requires no modification whatsoever, either in the filler or in the casing, the changes merely comprising the substitution, for the ordinary stopper, of a stopper having the tubes 32, 35 and 73 fixed therein and the screw cap 18 being changed by merely stamping out the aperture 34, brazing on the lugs 22, and soldering or brazing in place, the spring 20 and washer 21. The filler 14 is removed for cleaning and sterilizing and replaced with the same facility as in the handling of an ordinary vacuum bottle.

If the wall of the vacuum bottle were modified at any locality for application of the measuring scale or the thermometer, in such manner as to reduce the insulating efficacy at such locality heat would be radiated and a circulation of fluid in the bottle might be set up substantially destroying the heat insulating property of the container.

Thus it will be seen that I have provided a device for administering fluids to the body, which is particularly inexpensive and easily constructed, in which the temperature of the fluid may be readily checked and is maintained constant throughout administration, without the use of auxiliary heating means, which renders possible the accurate control and measuring of volume, is readily cleaned and sterilized, in which any frangible parts are readily replaced when broken, and in which no small parts are provided, which are likely to become lost or misplaced, and which is, moreover, neat and attractive in appearance.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters-Patent of the United States is:—

1. A device for the administration of fluids, comprising in combination, a casing, an inverted vacuum bottle filler therein, a closure for the mouth of said filler, outlet means through said closure and indicating means connected to the closure and acted upon by the charge of fluid in said filler.

2. A device for the administration of fluids, comprising in combination, an inverted vacuum bottle, a closure for the mouth thereof at the lower end, a clamping collar encircling said bottle, measuring accessory means carried by said collar, said means including a level gauge and a thermometer, a conduit connection from the interior of said bottle to said level gauge, and an independent outlet connection through said closure to deliver the liquid into contact with the thermometer bulb.

3. A device for the administration of fluids comprising a casing, an inverted removable vacuum bottle filler therein, a closure for the mouth thereof at the lower end, a socket supported by said casing for housing the bulb of a thermometer, means for delivering fluid through said closure into said socket, and outlet means from said socket.

4. A device for the administration of fluids comprising a casing, a removable inverted vacuum bottle filler therein, a stopper for the latter, a closure cap for said casing, an outlet tube through said stopper exposed through a corresponding opening in said closure cap, a socket carried by said casing for housing the bulb of a thermometer, a conduit connecting the outlet of said casing to said socket, and delivery means including an outlet nipple for said socket.

5. A device for the administration of fluids comprising a casing having a removable head, a removable vacuum bottle in said casing, a stopper for said bottle, a removable cap closing the casing and exerting pressure against the stopper, means for sustaining the container with the stopper and cap lowermost, a socket mounted on said container for housing a thermometer bulb, an outlet tube through the stopper and projecting from the closure cap, conduit means connecting said tube to said socket to immerse the thermometer bulb, and outlet means from said socket for connection to a fluid delivery element.

6. In a device for the administration of fluids, in combination, a casing having a base and a removable head, a removable vacuum bottle filler therein, a stopper therefor, a closure cap for said casing, exerting pressure against said stopper to prevent the latter from dropping, bracket means attached to said casing, a vertical gauge tube mounted on said bracket means, and connecting conduit means through said stopper communicating with the lower end of said tube.

7. In a device for the administration of fluids, in combination, an inverted cylindrical casing, a removable head therefor, a removable vacuum bottle maintained in inverted position within said casing and having a stopper, a cap threaded on the head of the casing and exerting pressure against the stopper to maintain it in position in the bottle, bracket means connected to said casing, a vertical level gauge and a thermometer supported upon said bracket means, conduit means connecting said gauge and the bulb of said thermometer with the interior of the bottle, said conduit means extending through said stopper, and a delivery conduit from adjacent said thermometer.

8. In a device for the administration of fluids, in combination, an inverted cylindrical casing, a removable head therefor, a removable vacuum bottle maintained by said head in inverted position within said casing, a stopper for said bottle, a cap threaded on the head of the casing and exerting pressure against the stopper, a bracket collar encircling said casing, said collar having a pair of projecting arms, a socket for the bulb of a thermometer supported by one of said arms, a level gauge supported by the other of said arms, a pair of outlet tubes through said stopper, conduit means connecting said tubes, one with the lower end of said level gauge and the other with said socket, and outlet means from said socket for delivery of the fluid therefrom.

9. In a device for the administration of fluids, in combination, an inverted cylindrical metallic casing, a head member removably threaded thereto, a closure cap therefor, a bead adjacent said head, a removable vacuum bottle in said casing having a stopper, spring means in said cap to yieldingly hold the stopper in home position, a clamping collar encircling said casing adjacent said bead, said collar having a loop rigid therewith, a thermometer socket carried by said loop, a thermometer removably supported by said socket and having its bulb depending thereinto, a bracket rigid with said collar, said bracket having an eye, a level gauge sustained by said eye, a pair of tubes through said stopper and protruding from said cap, a pair of flexible conduits respectively connecting one of said tubes to the lower end of said level gauge and the other to said thermometer socket, and an air tube through said stopper projecting upward to near the opposite end of the bottle.

10. The combination set forth in claim 9 in which the three tubes through the stopper are permanently fixed therein.

11. In a device for the administration of fluids, in combination, a vacuum bottle, holder means including a casing sustaining said bottle in inverted position, bracket means connected to said casing and including an eye near the lower end of the casing, and a spring clip near the upper end thereof, a level gauge supported by said eye and said clip, said gauge comprising a tube of external diameter somewhat smaller than that of said eye and including stop means to rest upon said eye, whereby for assembly of the device, the lower end of the gauge tube is passed through said eye until the projecting stop rests thereon and the upper end of said tube is then tilted about said eye and snapped into said clip, and conduit means to establish communication between the interior of the bottle and the level gauge.

12. The combination set forth in claim 11 in which the level gauge includes a protective metallic tube, a longitudinal fin integral therewith and projecting therefrom, said fin having scale markings thereon, and a transparent tube within said metallic protective tube, exposed through a longitudinal slit in said metallic tube.

13. In a device for the administration of fluids, in combination, an inverted vacuum bottle having a protective casing, outlet means through the closure thereof, measuring accessory means carried thereby for indicating the state of the fluid delivered therefrom, and suspension means for said device including a ring encircling said casing and fixed thereto near the upper end thereof, a hinged bail having eyes, and screws securing said eyes to said ring.

14. A device for the administration of fluids comprising in combination, an inverted vacuum bottle, a closure for the mouth thereof at the lower end, an outlet connection through said closure, and indicating means connected to the closure and acted upon by the charge of fluid in said bottle.

15. A device for the administration of fluids comprising in combination, an inverted vacuum bottle, a closure for the mouth thereof, means maintaining said closure against dropping from the inverted bottle, a socket for housing the bulb of a thermometer carried by said bottle, an outlet connection through said closure to said socket, and outlet means from said socket.

16. A device for the administration of fluids comprising in combination, an inverted vacuum bottle, a closure for the mouth thereof, means maintaining said closure against dropping from the inverted bottle, a gauge tube mounted upon said bottle, connecting conduit means through said closure communicating with the lower end of said tube, and outlet means through said closure for delivery of fluid from the bottle.

Signed at New York city, in the county of New York and State of New York, this 13th day of February A. D. 1923.

JACOB BUCKSTEIN.